3,091,614
IMPROVEMENT IN PRODUCTION OF O,O-DIAL-
KYL-O,-2-PYRAZINYL PHOSPHOROTHIOATE
Bernard Miller, Princeton, N.J., and Malcolm Robbins
Forbes, New Rochelle, N.Y., assignors to American
Cyanamid Company, New York, N.Y., a corporation of
Maine
No Drawing. Filed Jan. 9, 1962, Ser. No. 165,257
4 Claims. (Cl. 260—250)

The present invention relates to a novel and improved method for preparing phosphate esters of the general formula

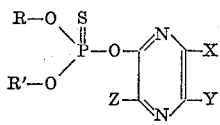

wherein R and R' represent lower alkyl, such as methyl, ethyl, propyl, isopropyl and butyl, and X, Y and Z each represent hydrogen, halogen, phenyl or a lower alkyl.

Compounds of the general formula given above and their preparation are fully described in U.S. 2,918,468, patented December 22, 1959. In this patent a dialkyl phosphorochloridothioate of the formula

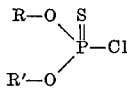

is reacted with an alkali metal salt of a hydroxypyrazine of the formula

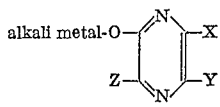

in an inert solvent and at a temperature in the range of about 10° C. to about 100° C., preferably between 20° C. and 60° C. R, R', X, Y and Z in the latter two formulae have the same meaning given above in the product formula.

According to U.S. 2,918,468 the O,O-dialkyl O-(2-pyrazinyl)phosphorothioates may also be prepared by reacting dialkyl phosphorochloridothioate with the hydroxypyrazine in an inert solvent in the presence of a hydrogen chloride acceptor, such as an alkali metal or an alkaline earth metal carbonate.

Suitable inert solvents according to U.S. 2,918,468 are water, dimethylformamide, dioxane, N-methyl-2-pyrrolidone, acetonitrile, benzene, toluene, xylene, the lower aliphatic monohydric alcohols, ketones, such as acetone, methyl ethyl ketone, methyl isobutyl ketone, methyl benzyl ketone and cyclohexanone, and aliphatic esters, such as ethyl acetate, 2-ethylhexyl acetate, methyl propionate, ethyl butyrate and isopropyl butyrate.

Pursuant to the instant discovery it has been found that very significant increases in yields and substantially purer products may be achieved by modifying the process of U.S. 2,918,468. Pursuant to the instant invention an alkali metal salt of a hydroxypyrazine of the formula

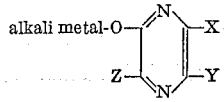

is brought into reactive contact with a dialkyl phosphorochloridothioate of the formula

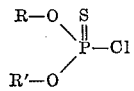

at a temperature in the range of 10° C. to about 100° C., preferably 60° C. to 90° C., and in the presence of cuprous chloride ($Cu_2Cl_2$) catalyst. Ketones of the type described above, such as methyl isobutyl ketone, and so on, are the preferred solvents. R, R', X, Y and Z have the meanings given above.

Further, it has been discovered pursuant to the present discovery that optimum results are achieved when cuprous chloride particulates of a particular size are employed. At least 95% of the particulates should be capable of passing through a 200-mesh Tyler screen. It is also preferable to maintain an excess of the alkali metal salt of a hydroxypyrazine, based upon the dialkyl phosphorochloridothioate reactant, throughout the reaction. An excess up to 20%, preferably from 10% to 15%, is maintained.

Surprisingly enough, product purity in the neighborhood of 95 percent by weight and greater is realized as a result of the instant discovery. The reason for this improvement is not known. Furthermore, it is very surprising that the copper in cuprous chloride does not, as a potential contaminant, deleteriously affect the pesticidal activity of the products herein prepared. One would expect problems, such as phytotoxicity, etc.

On the contrary, beneficial results have been achieved by virtue of the presence of only minor amounts of copper in the final product. For instance, whereas petroleum ether insoluble tars in the range of 10 to 20 percent by weight heretofore accompanied the production of the products of the present invention, no cuprous chloride being used to catalyze the process, the instant discovery has reduced the amount of these tars to 1 percent by weight, or less.

The products as prepared heretofore had a tendency to solidify upon standing. Using the process of the present invention, however, much more stable products are achieved. The exact reason for this is not fully understood but it is known that the use of cuprous chloride as taught herein makes the difference.

The cuprous chloride particulates employed for optimum results generally have a surface area in the range of 0.5 square meter per gram to 1.0 square meter per gram (m.$^2$/gm.), preferably about 0.6 to 0.8 square meter per gram.

It should be noted that up to 20 grams of $Cu_2Cl_2$ per mole of dialkyl phosphorochloridothioate reactant may be used to achieve the very desirable results of the present discovery, preferably about 15 grams of $Cu_2Cl_2$ per mole of dialkyl phosphorochloridothioate. Any practical amount, however, is beneficial.

The present invention will best be understood from the following example:

EXAMPLE I

O,O-diethyl-O-(2-pyrazinyl)phosphorothioate is prepared from O,O-diethylphosphorochloridothioate and sodium pyrazinolate, 15% excess, in the presence of 15 grams of cuprous chloride per mole of O,O-diethylphosphorochloridothioate, and in a methyl isobutyl ketone medium. The $Cu_2Cl_2$ particulates, over 95% of which could pass through a 200-mesh (Tyler) screen, had an average surface area of 0.7 square meter per gram (m.$^2$/gm.). The O,O-diethylphosphorochloridothioate is added over a one hour period at 80° C. followed by a hold period of 1.5 hrs. at 80° C. The reaction mixture is cooled to 25° C. and filtered to remove NaCl and other insolubles, sodium pyrazinolate and cuprous salts. The resulting filter cake is washed to remove occluded product. The filtrate is washed twice with water and then stripped in a low residence time evaporator to remove the solvent.

The isolated product O,O-diethyl-O-(2-pyrazinyl)phosphorothioate is recovered at a purity of 90–95% and in 80–90% real yields, based upon O,O-diethylphosphorochloridothioate.

The following examples carried out essentially as in Example I, supra, further illustrate the present invention:

Table 1

| Ex. No. | R—O\\P(=S)/R'—O—P—Cl (A) R | R' | Alkali metal | Alkali metal-O—pyrazinyl—X, Y, Z (B) X | Y | Z | Percent excess of (B) over (A) | Temp., °C. | Cu₂Cl₂ catalyst Gms. per mole (A) | Surface area (m.²/gm.) | Solv. | R—O\\P(=S)/R'—O—pyrazinyl (C) |
|---|---|---|---|---|---|---|---|---|---|---|---|---|
| II | Ethyl | Ethyl | Na | H | H | H | 12 | 70 | 15 | 0.8 | Methyl ethyl ketone | O,O-diethyl-O-(2-pyrazinyl)phosphorothioate. |
| III | Methyl | Methyl | K | H | H | H | 10 | 90 | 18 | 0.5 | Methyl benzyl ketone | O,O-dimethyl-O-(2-pyrazinyl)phosphorothioate. |
| IV | Butyl | Butyl | Na | Cl | H | H | 5 | 85 | 15 | 1.0 | Methyl isobutyl ketone | O,O-dibutyl-O-(6-chloro-2-pyrazinyl)phosphorothioate. |
| V | Propyl | Propyl | Na | H | $C_6H_5$ | H | 13 | 55 | 13 | 0.6 | Acetone | O,O-dipropyl-O-(5-phenyl-2-pyrazinyl)phosphorothioate. |
| VI | Ethyl | Ethyl | Na | $C_6H_5$ | $C_6H_5$ | H | 15 | 75 | 19 | 0.6 | Cyclohexanone | O,O-diethyl-O-(5,6-phenyl-2-pyrazinyl)phosphorothioate. |
| VII | Methyl | Methyl | K | Br | H | H | 15 | 75 | 11 | 0.7 | Methyl isobutyl ketone | O,O-dimethyl-O-(6-bromo-2-pyrazinyl)phosphorothioate. |
| VIII | Butyl | Butyl | Na | H | H | $C_6H_5$ | 18 | 30 | 14 | 0.8 | tert-Butanol | O,O,dibutyl-O-(3-phenyl 2-pyrazinyl)-phosphorothioate. |
| IX | Isopropyl | Isopropyl | Na | $C_2H_5$ | $C_2H_5$ | H | 20 | 45 | 13 | 0.6 | do | O,O-diisopropyl-O-(5,6-diphenyl-2-pyrazinyl)-phosphorothioate. |
| X | Ethyl | Ethyl | K | $CH_3$ | $CH_3$ | Cl | 9 | 80 | 13 | 0.9 | Methyl isobutyl ketone | O,O-diethyl-O-(3-chloro-2-pyrazinyl)phosphorothioate. |
| XI | do | do | Na | Cl | Cl | $C_2H_5$ | 11 | 75 | 6 | 0.7 | Ethyl acetate | O,O-diethyl-O-(3-ethyl-5,6-dichloro-2-pyrazinyl)phosphorothioate |
| XII | Propyl | Propyl | Na | H | H | iso-$C_3H_7$ | 3 | 50 | 9 | 0.7 | Methyl isobutyl ketone | O,O-dipropyl-O-(3-isopropyl-2-pyrazinyl)-phosphorothioate. |

The compounds of the present invention are highly active insecticides and acaricides and may be used as sprays in organic solvents, as emulsions in water or other non-solvents, or on solid carriers, such as talcs, clays, diatomaceous earths and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method of preparing a phosphate ester of the formula

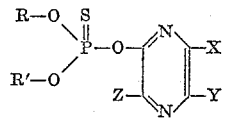

wherein R and R' each represent lower alkyl, and X, Y and Z each represent a member selected from the group consisting of hydrogen, halogen, phenyl and a lower alkyl, which comprises reacting dialkyl phosphorochloridothioate of the formula

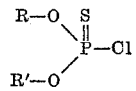

with an alkali metal salt of a hydroxypyrazine of the formula alkali metal-O—pyrazinyl ring with X, Y, Z substituents said reaction being made to take place in the presence of an inert solvent and in the presence of up to about 20 grams cuprous chloride ($Cu_2Cl_2$) catalyst per mole of dialkyl phosphorochloridothioate, and recovering the resulting phosphate ester of the general formula above, R, R', X, Y and Z in the reactant formulae having the same meaning given them in the product formula, supra.

2. The process of claim 1 wherein the alkali metal salt of a hydroxypyrazine reactant is present, throughout the reaction, in excess relative to the dialkyl phosphorochloridothioate reactant.

3. The process of claim 1 wherein the cuprous chloride is present in the form of particulates having a surface area in the range of 0.5 square meter per gram to 1.0 square meter per gram.

4. The process of claim 1 wherein O,O-diethylphosphorochloridothioate and sodium pyrazinolate are reacted and O,O-diethyl-O-(2-pyrazinyl)phosphorothioate is produced.

References Cited in the file of this patent

UNITED STATES PATENTS 2,784,207    Geoghegan et al.    Mar. 5, 1957
2,918,468    Dixon    Dec. 22, 1959

FOREIGN PATENTS 713,278    Great Britain    Aug. 11, 1954